(12) United States Patent
Thomson et al.

(10) Patent No.: US 12,717,756 B2
(45) Date of Patent: Aug. 25, 2026

(54) SYSTEMS, METHODS, AND DEVICES TO ASSESS MEDICAL SCHOOL APPLICANT DATA

(71) Applicant: Medicratic Inc., Irving, TX (US)

(72) Inventors: Alexander Thomson, New York, NY (US); Tanner Mitton, Irving, TX (US); David Elder, New York, NY (US)

(73) Assignee: MEDICRATIC INC., Irving, TX (US)

( * ) Notice: Subject to any disclaimer, the term of this patent is extended or adjusted under 35 U.S.C. 154(b) by 0 days.

(21) Appl. No.: 18/970,624

(22) Filed: Dec. 5, 2024

(65) Prior Publication Data

US 2025/0094387 A1 Mar. 20, 2025

Related U.S. Application Data

(63) Continuation of application No. 18/594,912, filed on Mar. 4, 2024, now Pat. No. 12,265,502.

(60) Provisional application No. 63/450,827, filed on Mar. 8, 2023.

(51) Int. Cl.
*G06F 16/16* (2019.01)

(52) U.S. Cl.
CPC .................................. *G06F 16/164* (2019.01)

(58) Field of Classification Search
CPC ..................................................... G06F 16/164
See application file for complete search history.

(56) References Cited

U.S. PATENT DOCUMENTS 9,536,522 B1 * 1/2017 Hall .................... G06F 16/3344
10,705,796 B1 * 7/2020 Doyle .................. G06F 16/282
11,269,808 B1 * 3/2022 Yuan .................... G06F 16/172
11,307,830 B2 * 4/2022 Bodin .................... G06F 21/31
11,567,959 B2 * 1/2023 Filippi ................. G06F 16/164
11,790,898 B1 * 10/2023 Teng ...................... G10L 15/19
704/257
11,887,129 B1 * 1/2024 Amir ...................... H04L 63/08
11,983,552 B2 * 5/2024 Dubba ................. G06F 3/0481
12,010,504 B2 * 6/2024 Han ..................... G06F 3/0346
2017/0010956 A1 * 1/2017 Chen ...................... G06F 11/36
2017/0024311 A1 * 1/2017 Andrejko ........... G06F 11/3698
2018/0144067 A1 * 5/2018 Chatelain ............. G06F 16/164
2018/0285354 A1 * 10/2018 Minami ................ G06V 20/64
2019/0266500 A1 * 8/2019 Basiri .................... G06Q 10/10
2020/0117829 A1 * 4/2020 Barday .............. G06F 21/6245
2020/0143247 A1 * 5/2020 Jonnalagadda ........ G06N 3/044
2020/0265336 A1 * 8/2020 Merrill .................. G06N 5/045
2020/0272791 A1 * 8/2020 Jonnalagadda .......... G06N 5/04
2021/0042867 A1 * 2/2021 Keni .................... G06F 16/906
2021/0064672 A1 * 3/2021 Mahadi .................... G06N 5/02
2021/0141932 A1 * 5/2021 Barday ................ G06F 16/125
2021/0406839 A1 * 12/2021 Camenares ............. G10L 17/00
2022/0092028 A1 * 3/2022 Layton ................. G06F 16/284
2022/0237725 A1 * 7/2022 Aldworth ............... G06Q 20/02
(Continued)

*Primary Examiner* — Eliyah S. Harper
(74) *Attorney, Agent, or Firm* — NORTON ROSE FULBRIGHT US LLP

(57) ABSTRACT

A system operable to analyze applicant features having at least one user computing device in operable communication with a user network. An application server in operable communication with the user network to host an application system for analyzing the plurality of applicant features and transmitting the plurality of applicant features to a comparator operable to compare the plurality of features to one or more other applicants.

21 Claims, 6 Drawing Sheets

(56) References Cited

U.S. PATENT DOCUMENTS

| | | | | |
|---|---|---|---|---|
| 2022/0358162 | A1* | 11/2022 | Venugopala Reddy | G06F 16/906 |
| 2023/0214461 | A1* | 7/2023 | Brooks | G06F 21/16 705/27.1 |
| 2023/0394714 | A1* | 12/2023 | Namasivayam | G06T 11/00 |
| 2023/0410793 | A1* | 12/2023 | Clifton | G06N 3/045 |
| 2024/0086366 | A1* | 3/2024 | Gnanasambandam | A61B 5/14532 |
| 2024/0126720 | A1* | 4/2024 | Nagar | G06F 16/166 |
| 2024/0126795 | A1* | 4/2024 | Zhong | H04L 51/02 |
| 2024/0193373 | A1* | 6/2024 | Alexander | G06F 40/35 |
| 2024/0274247 | A1* | 8/2024 | Sunder | G06Q 10/105 |
| 2024/0281410 | A1* | 8/2024 | Williams | G06F 16/164 |
| 2024/0281419 | A1 | 8/2024 | Alfaras et al. | |
| 2024/0289863 | A1* | 8/2024 | Smith Lewis | G06N 3/008 |
| 2024/0304177 | A1* | 9/2024 | Wu | G06T 13/40 |

* cited by examiner

SYSTEMS, METHODS, AND DEVICES TO ASSESS MEDICAL SCHOOL APPLICANT DATA

CROSS-REFERENCE TO RELATED APPLICATIONS

This application is a continuation of U.S. Non-Provisional patent application Ser. No. 18/594,912, filed Mar. 4, 2024 and titled "MULTI-PROGRAM APPLICANT REVIEW SYSTEM WITH ADJUSTABLE PARAMETERS," which claims priority to U.S. Provisional Patent Application Ser. No. 63/450,827, filed Mar. 8, 2023 and titled "MULTI-PROGRAM APPLICANT REVIEW SYSTEM WITH ADJUSTABLE PARAMETERS," the entireties of which are herein incorporated by reference.

BACKGROUND

1. Technical Field

Embodiments disclosed herein relate to systems and methods for evaluating applicants and more particularly to advanced software for evaluation and filtering of applications for medical residency programs.

2. Discussion of Related Art

When applying for universities, employment, post-graduate opportunities, and the like, applicants submit an application to the receiving party for review. Applications range in complexity depending on the type of opportunity being applied for. In particular, medical residency programs require comparatively complex applications which contain many components. Their review can be a long, tedious process and reviewers of the applications may receive a high volume of applications to review.

Human review of applications has various limitations and disadvantages including poor subjective review, inconsistency across reviewers, inconsistency by a single reviewer, human bias, propagation of inequity, inability to review applications holistically, and reliance on heuristics for application selection.

Proxy screening methods are available. However, various limitations and disadvantages include ineffective screening and misclassification of applicants, not reviewing large proportions of applicants, and the forcing of inappropriate use of standardized tests, research output cutoffs, and other tools as filtering tools. This creates the incentive for medical students to produce low quality research as well as engage in subpar activities that do not contribute to increased ability as a physician.

SUMMARY

This summary is provided to introduce a variety of concepts in a simplified form that is disclosed further in the detailed description of the embodiments. This summary is not intended for determining or limiting the scope of the claimed subject matter.

In some instances, the embodiments provided herein relate to an applicant data assessment platform for analyzing applicant features from files inputted to at least one user computing device in operable connection with a user network. An applicant data assessment platform can include an application server in operable communication with the user network to host an application system for analyzing the plurality of user features extracted from the files and transmitting the plurality of user features to a comparator for comparing the plurality of features to those extracted from one or more other users.

In some examples, the applicant data assessment platform can include systems and methods which provide a multi-program applicant review system with adjustable parameters. Medical residency application files and other types of applicant input data (e.g., resumes, medical school admissions documents, performance review documents, etc.) can be uploaded to an input interface of a program host device by residency training program staff. Additionally or alternatively, the application files and other applicant input data can be obtained through an application programming interface (API) call (e.g., to a third-party server), manually entered, or other methods. The applicant data assessment platform can then separate individual applications and extract relevant applicant qualities from the applications, while analyzing and enabling correction for various biases. These qualities can include, but are not limited to, research output, standardized test scores, grades, preference signals, geographic preferences, educational degrees, schools attended, languages spoken, past experiences, demographics, humanistic qualities found in letters of recommendation and other free text material. The extracted qualities can be modulated, filtered, and weighted by data inputs provided as preference parameters by residency program training staff to determine importance and relevance for that particular residency program, to aid in creation of a ranked applicant list for interview invitation and final applicant ranking according to each residency program's preferences.

In some instances, a method of assessing applicant data includes receiving, via a first user interface of an applicant computing device, input applicant data including one or more document files; receiving, via a second user interface of one or more program host device, one or more inputs establishing one or more preference parameters for an applicant assessment platform; and/or performing, with at least one processor of the one or more program host device, a machine-learning (ML)-based assessment of the one or more document files to generate a ML-based score corresponding to the input applicant data and the one or more preference parameters. The ML-based assessment can include at least: a document normalization of the one or more document files to create one or more normalized document files, a semantic embedding of the one or more normalized document files to form one or more embedded normalized files, and/or an attribute indicator selection for the one or more embedded normalized files. The method can also include presenting, at the second user interface of the one or more program host device, an applicant ranking based at least partly on the ML-based score.

In some examples, the ML-based assessment further includes a bias mitigation operation performed as part of the document normalization. The bias mitigation operation can include detecting one or more potentially biasing identifiers from the one or more document files, and/or replacing the one or more potentially biasing identifiers with one or more corresponding neutral terms while maintaining a semantic structure of the semantic embedding. Also, the ML-based assessment can include a dimensionality reduction operation performed on the one or more embedded normalized files to form one or more reduced-dimension embeddings used for the attribute indicator selection. Additionally, the attribute indicator selection can include identifying a plurality of attribute indicators corresponding to a plurality of the one or more preference parameters, and/or generating a plurality of sentiment scores corresponding to the plurality of attribute indicators. The ML-based score can include an aggregation of the plurality of sentiment scores.

In some scenarios, the ML-based assessment can further include an unsupervised clustering operation performed on the one or more embedded normalized files to form one or more clusters used by the attribute indicator selection. A particular cluster of the one or more clusters can be an aggregation of sentiments that have similar or identical meanings. Additionally, the unsupervised clustering operation can include a Hierarchical Density-Based Spatial Clustering of Applications with Noise (HDBSCAN) to extract a flat clustering based on a stability of the one or more clusters. In other words, the unsupervised clustering operation can analyze a hierarchical cluster arrangement to identify, based on cluster stabilities, a flat cluster arraignment. The ML-based assessment can also include determining, for a plurality of sentences of the semantic embedding, a plurality of semantic closeness value corresponding to a sentiment of an attribute indicator from the attribute indicator selection, and/or the ML-based score can include an aggregation of the plurality of semantic closeness values. Furthermore, the user can be presented with a user interface option (e.g., prior to generating the ML-based score and/or after determining the semantic embeddings or semantic closeness values) to choose, based on received input, which semantic closeness values are used by the platform to generate the ML-based score.

In some instances, a system for assessing applicant data can include input applicant data originating from an applicant computing device and provided to a program host computing device; one or more preference parameters based on inputs provided at the program host computing device; a document pre-processing system, executed by one or more processors of the program host computing device, to normalize the input applicant data to form normalized data; a semantic embedding generator, executed by the one or more processors of the program host computing device, to form semantic embeddings of the normalized data; an attribute indicator selector, executed by the one or more processors of the program host computing device, to determine a plurality of attribute indicators from the semantic embeddings; and a machine-learning (ML)-based score, generated by aggregating the plurality of attribute indicators, the ML-based score being presented at a display of the program host computing device with a bio associated with the input applicant data.

In some examples, the one or more preference parameters includes a weight value assigned to a research output based on a relation of the research output to a particular field. Also, the system can include an applicant ranking including a listing of a plurality of applicants, presented at a graphical user interface (GUI) of the program host computing device, based on a plurality of ML-based scores generated by the program host computing device. Additionally, the ML-based assessment can further include: identifying a common source or a common author for a plurality of document files from different sets of applicant data associated with different applicants, and/or determining a comparison value for the plurality of document files based on the common source or the common author, the ML-based score using the comparison value.

In some scenarios, a device for assessing applicant data includes a display; one or more processors; and/or one or more non-transitory memory devices storing instructions which, when executed by the one or more processors, cause the device to: receive input applicant data including one or more document files; receive, via a user interface of the display, one or more preference parameters; perform a machine learning (ML)-based assessment of the input applicant data to generate a ML-based score corresponding to the input applicant data and the one or more preference parameters; and/or present, at the user interface of the display, an applicant ranking based at least partly on the ML-based score.

In some examples, performing the ML-based assessment includes a document normalization of one or more document files of the input applicant data to create one or more normalized documents, the ML-based assessment uses the one or more normalized documents to generate the ML-based score. Performing the ML-based assessment can also include a semantic embedding of the one or more normalized documents to form one or more embedded normalized files, the one or more embedded normalized files can be used to generate the ML-based score. Performing the ML-based assessment can include an attribute indictor selection to determine a plurality of attribute indicators from the one or more embedded normalized files, the ML-based assessment uses the plurality of attribute indicators to generate the ML-based score. Moreover, performing the ML-based assessment can include a bias mitigation operation to replace one or more potentially biasing identifiers in the input applicant data with one or more corresponding neutral terms. The ML-based assessment can use the one or more corresponding neutral terms to generate the ML-based score.

In some instances, performing the ML-based assessment can also include a dimensionality reduction operation performed on the one or more embedded normalized files to form reduced-dimension embeddings. The ML-based assessment can use the reduced-dimension embeddings to generate the ML-based score. Performing the ML-based assessment can include an unsupervised clustering operation performed on the one or more embedded normalized files to form a plurality of clusters, and the ML-based assessment can use the plurality of clusters to generate the ML-based score. Additionally, presenting the applicant ranking can further include presenting a bio, generated from words extracted from the input applicant data, with the ML-based score.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
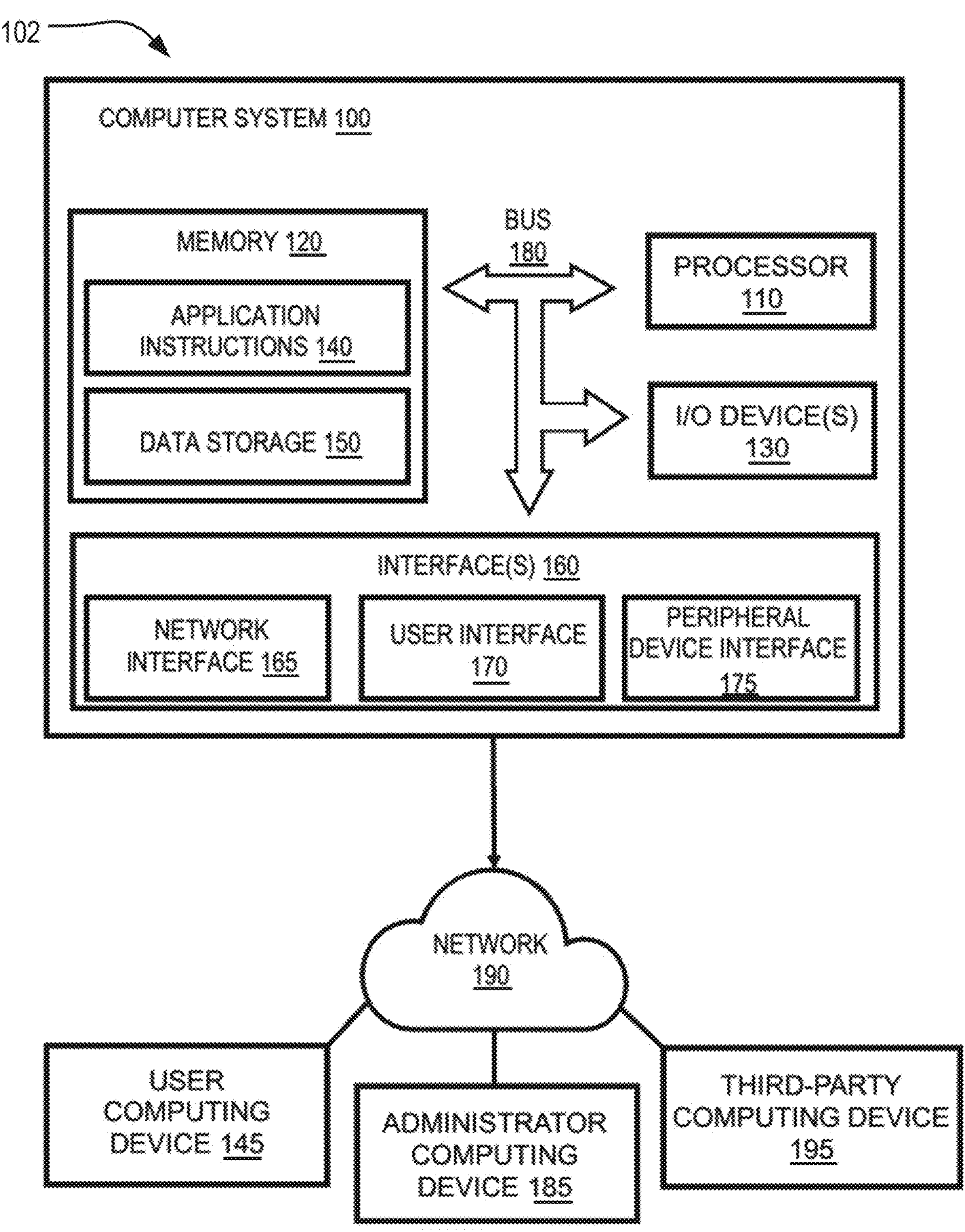
FIG. 1 illustrates an example system architecture diagram for implementing an applicant data assessment platform according to some embodiments.

The specific details of a variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. It is to be understood that any aspects or components of the applicant data assessment platform disclosed herein can be repeated, omitted, arranged in different configurations, and/or can be combined with any other aspects or components disclosed herein.

In general, the embodiments provided herein relate to systems and methods for providing a multi-program applicant review system with adjustable parameters. In examples where the program being hosted is a medical residency program, medical residency application files can be uploaded to the system from residency training program staff. In scenarios where the program being hosted is a university or college program, admissions personnel or other university personnel can upload the application files. Additionally, where the program is a position at a company, employees (e.g., HR personnel) can upload the application files. Moreover, the input application files can come from other sources and/or can be provided by the applicant at an uploading portal. The system can then separate individual applications and extract relevant applicant qualities from the applications, while analyzing and correcting for various biases. These qualities can include, but are not limited to, research output, standardized test scores, grades, preference signals, geographic preferences, class rank, leadership positions, notable awards or achievements, educational degrees, schools attended, languages spoken, past experiences, demographics, humanistic qualities found in letters of recommendation and other free text material.

In some examples, the extracted qualities can be modulated, filtered, and weighted by personnel associated with the program host (e.g., residency program training staff, employees, reviewers, and so forth) via preference data provided to the input device to identify attribute indicators which determine importance and relevance for that particular residency program, to aid in creation of a ranked applicant list for interview invitation, and final applicant ranking according to each residency program's preferences. For instance, preference parameter data can be provided to the system by presenting, at the user device, a series of hypothetical scenarios (e.g., in a quiz or questionnaire format), and responses provided as inputs to the series of hypothetical scenarios can then be converted to numbers and values to determine how that particular entity "values" each part of the application. In another example, the preference parameter data can be provided by requesting the user provide ordinal and/or cardinal rankings or values of various parts of the application. These operations for generating preference parameters from the responses can, in some instances, omit machine-learning algorithms, and may be as simple as receiving numerical weights for each section of the application from the user. In some instances, machine-learning algorithms may be used, and the user may be requested to provide, either from historical or hypothetical data, applications categorized, ranked, or scored based on "desirability" (e.g., a set of applications where each is labelled as 'interview', 'waitlist', or 'reject'). Machine-learning algorithms could then be applied to this categorized or scored data to create, train, and test models that determine, estimate, and/or approximate the value of each application, or each part of the application, based upon the user's categorization, ranking, and/or scoring decisions. Any combination of these approaches, and other unnamed approaches, could be used.

As used herein the term "feature" or "features" may be used to describe parameters which are used by the applicant data assessment platform to evaluate the candidate's application and the candidates' qualities to provide an applicant ranking. The features may include, but are not limited to, any number of the following: board exam scores, research output, demographics, research experience, Medical Student Performance Evaluation(s) (MSPE), letters of recommendation, leadership experience, work experience, volunteer experience, other past experiences, educational degrees, personal statement(s), grades, awards, accomplishments, medical school attended, preference signals, languages spoken, regional connections, honors society memberships, and "red flags".

In some embodiments, one or more feature is designated a weight, which can be based on one or more preference parameters. Weights can be applied as multipliers to the different feature scores and the sum of scores can be used to generate a final score for that applicant. Additionally or alternatively, the weights can be determined or applied based on linear, logarithmic, monotonic, nonmonotonic, stepwise, continuous, discontinuous, or exponential functions, and/or the product of multiple functions, using a weighing formula. Additionally, an applicant's final score can be determined in the context of the opportunities an applicant had available to them. For instance, if an applicant never had the opportunity to join a given honor society because there was no chapter of the honor society at their school, a modifying weight may be applied to proportionally increase their final score, such that they are not penalized for not having had the same opportunities as other applicants. Final scores associated with a plurality of applicants can then be used to rank the applicants, and a ranking output value can be provided to the user (e.g., presented at a graphical user interface (GUI) of the program host device).

In some examples, the applicant data assessment platform performs a document pre-processing procedure. For instance, the system can receive a PDF, word document, spreadsheet, comma-separated value (CSV) file, or other type of data, which can broken into individual files (hereafter referred to as applications) for each applicant. These applicant input data files can be received via manual entry and/or in a response to an API call sent from the applicant data assessment platform to a server storing the data files.

As discussed in greater detail below, the applications can then be analyzed with language processing machines and other machine-learning systems to identify specific components that pertain to the feature list. The various components are either analyzed by the applicant data assessment platform or, if no analysis is necessary, passed through to another stage.

In some embodiments, United States Medical Licensing Exam (USMLE) Boards exam scores, Comprehensive Osteopathic Medical Licensing Examination (COMLEX) scores, in-service training examination scores, board certification exam scores, and/or other test scores may be utilized as a component or input of the process. Users can have the option to use these scores in calculating a final applicant score. The preference parameters can indicate that the USMLE Board exam scores, COMLEX scores, in-service training examination scores, board certification exam scores, and/or other scores are used as either a threshold that applicants must reach to be considered, or on a graded scale where the higher an applicant scores the more points they receive, or both. The test scores can be pulled out of the PDF of applications using a language processing machine, received via one or more API calls to severs/databases storing the scores, manually entered, and so forth.

In some embodiments, research output may be utilized as a component of the process. Users can have the option to provide preference parameters to use an applicant's research output in calculating the final applicant score. The preference parameter can assign different values and weights to different publications based on relevance to the medical specialty of the entity associated with the host program device, the authorship position of the applicant (e.g., first author, second author, etc.), the impact factor of the journal, and the type of research output (e.g., peer-reviewed article, conference poster presentation, etc.). Additionally, users can have the option to filter out or eliminate research output that is duplicated or redundant on the application. Users may also have the option to have the software verify the existence of research publications or other research items via an API call to a third-party verification systems. The value of additional or marginal research output may be subject to diminishing returns, according to the preference parameters provided by the user.

Explaining further, applicants may list several research outputs (for example, peer-reviewed publications, oral presentations, posters, and accepted abstracts) having different data format types, but ultimately are all the same research project and research product, being presented in different ways. Accordingly the applicant data assessment platform can use natural language processing to sort through all of an applicant's research output, find the several outputs that are really duplications of the same underlying research data, and collapse them into fewer outputs or a single output for review. This duplication reduction procedure can eliminate what we have termed "publication inflation." The threshold of similarity at which two or more research outputs (e.g., having different data format types) are considered redundant, and therefore collapsed into fewer outputs or a single output, may be directly chosen by the user by providing preference parameter inputs (e.g., 90%, 80%, or 70% similarity threshold before collapsing occurs).

In some embodiments, demographics may be used by the applicant data assessment platform as a component of the processes disclosed herein, for instance, as part of a filtering or ordering process. Users can have the option presented at the GUI to filter the final applicant rank list by gender, under-represented minority status, ethnicity, race, educational degree, graduation year, visa status, work authorization, military service obligation, preference signal, completion of specific examinations, previous medical or other professional license suspension or revocation, extended education, previous felony or misdemeanor conviction, an insufficient number of letters of recommendation, any of the other features assessed within the application, and/or other demographic or significant factors.

In some embodiments, research experience may be utilized by the applicant data assessment platform as a component of the processes disclosed herein, for instance, as part of a profile labeling process. Users can have an option presented at the GUI to have the natural language processing algorithms read through a portion of text representing what applicants wrote about their experiences in research. The algorithms of the applicant data assessment platform disclosed herein can pull out the major themes that are present (e.g., "cancer treatments"), identify the theme as an attribute indicator, and/or attach those themes to the applicant's bio at the final applicant ranking list (e.g., presented at the GUI). A similar process may be performed to identify other types of experiences as themes, including work, leadership, volunteer, service, training, and education experiences, among others.

In some embodiments, Medical Student Performance Evaluation(s) (MPSE) may be provided as an input file to the applicant data assessment platform. The MSPE is a letter written for a medical student, usually by someone from their medical school dean's office. The MSPE provides an assessment and description of the medical student and can be several pages long. The MSPE can include text from evaluations of the student by other physician faculty. Users may have the option to use the software to "read" the MSPE and pull out the character qualities of the applicant. The applicant data assessment platform can use natural language processing algorithms to find the most common themes throughout a single applicant and/or a group or batch of applicants that the user submits (e.g., a few hundred, a few thousand, as many as 10,000, or so forth). The applicant data assessment platform can then score each applicant based on the different themes by determining how present that theme is in their MSPE and/or a strength of the theme in their MSPE, including, but not limited to, the strength of the recommendation that the MSPE author(s) provide(s) for the applicant. This process can lead to being able to score applicants on various character traits or attribute indicators (e.g., teamwork, clinical skill, work ethic, etc.).

In some examples, users of the applicant data assessment platform can provide threshold values for different character traits or attribute indictors from a list (e.g., presented at the GUI). The applicant data assessment platform can identify the applicants from the plurality of applicants that scored the highest in those areas and/or meet the threshold, based on their MSPE. This can be used by the applicant data assessment platform to determine a final "personal qualities" score which can be unique to the different applicants of the plurality of applicants, and can also be unique depending on the value imputed by the user for the different character traits. Thus, two different users (e.g., different medical residency programs) may use the applicant data assessment platform to generate different personal qualities scores for the same inputted target applicant data being assessed, because different users may choose to focus on different character traits and value them differently via their preference parameter inputs.

In some examples, the applicant data assessment platform can present an option to users (e.g., on the GUI of the program host device) to correct for gender or racial bias found in the MSPEs. Using econometric techniques, statistical techniques, and/or other techniques, the applicant data assessment platform can detect differences in scores that are systematic across race or gender and can correct for it across the various personal qualities, as discussed in greater detail below.

In some embodiments, letters of recommendation may be utilized as a component of the process, for instance, as input files to the applicant data assessment platform. The applicants can provide any number (e.g., between two and four) letters of recommendation as part of their applicant data, typically from physicians or faculty in their field. Users can be presented with the option to use the software to “read” these letters in the same manner as described for the MSPE. A letter of recommendation-based “personal qualities” score can be generated, and can either be kept separate from or combined with the MSPE “personal qualities” score, depending on user preference parameters received at the applicant data assessment platform. Furthermore, the strength of a recommendation (e.g., the extent to which the author of the letter recommends the applicant) can be determined based on the inputted letters of recommendation.

Additionally, letters of recommendation written by the same author for different applicants (e.g., in different sets of applicant data) may be identified by the applicant data assessment platform and/or compared for strength. For example, if a particular person (e.g., Dr. Z) writes six letters of recommendation for six different applicants, the applicant data assessment platform can identify those six letters of recommendation from Dr. Z and “read” them to determine the relative strength of each, again using natural language processing. The applicant data assessment platform can then determine which applicant Dr. Z most strongly recommends and/or most weakly recommends. This determination of the ranking of applicants within a set of letters from a single author can then be incorporated into the final score of the applicant, either alone or with the score generated by the general comparison of all letters. Similar to the MSPEs above, users can be presented with an option (e.g., at the GUI of the program host device) to analyze and correct for gender or racial bias found in the letters of recommendation.

In some embodiments, sections of text associated with leadership, volunteer, work, and other life experiences may be provided as input files to the applicant data assessment platform (e.g., responsive to an API call and/or manually entered via a user interface). Users can have the option to apply the natural language processing techniques to read through the section of the application in which leadership, volunteer, work, and other life experiences are identified. A subset of the top themes or attribute indicators present for each set of applicant data can be pulled out and displayed (e.g., at a display of the program host device) with the applicant’s bio in the final applicant ranking. Examples of themes which may be identified by the applicant data assessment platform can include “club president,” “registered nurse,” or “free clinic.” These themes can be included in the final score of the applicant data. Moreover, applicant indicators can be predefined by the applicant data assessment platform, and/or provided by the user via user inputs.

In some embodiments, the applicant data assessment platform can determine a language fluency factor from the input files, which may be used as a component of the process and/or can be used as a component of the final score during a final scoring process. Users can be presented with an option (e.g., at the GUI of the program host device) to indicate preferences for applicants that speak more than one language, and indicate which specific languages are most valuable and/or are associated with a greater weighing coefficient. For instance, residency program directors in Miami might provide a preference parameter input indicating a higher interest in applicants that speak Spanish, but don’t care as much about applicants that speak German. The applicant data assessment platform can also generate scores for various levels of fluency (e.g., native speaker vs conversational vs basic).

In some embodiments, educational degrees may be provided as an input data file to the applicant data assessment platform. An option to evaluate and score any extra degrees that an applicant may have (e.g., MBA, PhD) can be presented at the GUI of the program host device.

In some embodiments, one or more data files of text including one or more personal statements may be provided as input data to the applicant data assessment platform. Users can be presented with the option (e.g., at the GUI of the host program device) to apply the natural language processing software to read through the personal statement of each applicant, again pulling out major themes. Additionally or alternatively, the users can be presented with an option to provide or select specific questions for the applicant data assessment platform to answer, such as “has the applicant ever experienced poverty,” “has the applicant ever been a refugee,” “has the applicant ever experienced major illness,” and/or “does the applicant seem likely to pursue a career in academia?” Any and all information identified from the personal statement can be in included in the calculation for the applicant’s final score.

In some embodiments, one or more data files can include grades provided as input data to the applicant data assessment platform Users can be presented with the option (e.g., at the GUI of the host program device) to use the applicant data assessment platform to extract applicant’s grades out of the application for review. A final applicant grade score (e.g., similar to a GPA) may be calculated and can be included in a total/final score of the applicant data. Users may be presented with the option (e.g., at the GUI of the host program device) to weigh some courses more than others in the calculation of this grade score. The preference parameters can assign different values and weights to different grades and courses, based upon how the user values different grades and courses. For example, a particular type of program (e.g., pediatric residency programs) might care a lot more about an applicant’s grade in a particular type of program (e.g., a pediatric rotation) than the applicant’s grade in another type of program (e.g., a surgery rotation). In some scenarios, the grades can be visually presented at the host program device, for instance, as part of a list of applicants and/or a bio of an applicant generated by the applicant data assessment platform.

Additionally, the users may be presented with an option to consider varying degrees of grade inflation at different institutions in the determination of this grade score. In this way, grades from an institution with very little grade inflation can be more highly valued than the same grades from an institution with high levels of grade inflation. The applicant data assessment platform can present users with an option to perform a grade standardization operation which includes standardizing grades and grade schema across institutions. The applicant data assessment platform can also present users with an option to perform a grade inflation correction operation which takes into account “grade inflation” when scoring an applicant’s grades. These techniques can be performed using specific inputs, including an applicant’s grades, the grading schema of each course and institution, the distribution of grades for each course and institution, the user’s input preference parameters regarding the value of various grades and courses, standardized test scores at the institutional and individual level, and/or other useful data. The grade distribution for a given course or cohort of students can be obtained using machine learning techniques to extract the grade distribution directly from the text of the application. The applicant data assessment platform can use machine learning techniques to extract the grade distribution from images, graphs, charts, or other visual representations within the application, and/or by aggregating grades from multiple applications from the same institution, or in other ways. Once the grade distribution for a given course at a given institution is determined, there are multiple ways to standardize grades and correct for grade inflation, including (but not limited to) the following.

A first grade inflation correction technique can include performing a transformation that proportionally increases or decreases the value of a grade for an applicant when that applicant's grade is higher or lower, respectively, than the average grade for the class. This could be done using linear, exponential, logarithmic, continuous, discontinuous, discrete, piecewise, or other functions, or any combination of these and other functions. Maximum and minimum limits to the adjustment could be included.

A second grade inflation correction technique can include performing a transformation that proportionally increases or decreases the value of a grade for an applicant depending on the proportion of other students from the same institution that obtained a grade lower or higher, respectively, than the applicant in the given course, in other words, using the applicant's percentile rank for that course. This could be done using linear, exponential, logarithmic, continuous, discontinuous, discrete, piecewise, or other functions, or any combination of these and other functions. Maximum and minimum limits to the adjustment could be included. Other students that receive the same grade could be either included or excluded in performing the transformation.

A third grade inflation correction technique can include performing a transformation that proportionally increases or decreases the value of a grade for an applicant depending on the proportions of other students from the same institution that obtained each of the categorical grades that were lower or higher (respectively) than the applicant. This could be done using linear, exponential, logarithmic, continuous, discontinuous, discrete, piece-wise, or other functions, or any combination of these and other functions. Maximum and minimum limits to the adjustment could be included. Other students that receive the same grade could be either included or excluded in performing the transformation.

A fourth grade inflation correction technique can include performing a transformation that proportionally increases or decreases the value of a grade for an applicant depending on the distribution of other grades handed out for that course, as well as the uniqueness of the applicant's grade compared to the distribution, measured by its distance or distance squared from any number of other grades handed out for the course, or measured in another manner. This could be done using linear, exponential, logarithmic, continuous, discontinuous, discrete, piece-wise, or other functions, or any combination of these and other functions. Maximum and minimum limits to the adjustment could be included.

A fifth grade inflation correction technique can include selecting a baseline grading scheme and converting all other grading schema to the baseline using a transformation, including weighted average, linear, exponential, logarithmic, continuous, discontinuous, discrete, piece-wise, or other functions, or any combination of these functions. Broadly, this can be done by taking the range of possible grades for the same course (or appropriately similar courses) at different institutions and re-scaling all of them to the same scale. For example, if the baseline grading scheme is determined to be A/B/C/D, then a grading scheme that is Honors/High Pass/Pass could be converted to the A/B/C/D scheme by causing the value of an 'Honors' grade to be equivalent to the sum of two-thirds the value of an 'A' grade and one-third of the value of a 'B' grade; by causing the value of a 'High Pass' grade to be equivalent to the sum of half the value of an 'B' grade and half of the value of a 'C' grade; and by causing the value of a 'Pass' grade to be equivalent to the sum of one-third the value of an 'C' grade and two-thirds the value of a 'D' grade. Alternatively, the 'Honors' grade could be considered equivalent to an 'A', the 'High Pass' could be considered equivalent to the average of a 'B' grade and a 'C' grade, and the 'Pass' grade could be considered equivalent to a 'D' grade. It is to be understood that the transformations could be performed in several ways, depending on the context and what is deemed to be most appropriate for the situation.

Additionally or alternatively, the grade inflation correction technique(s) can include a grade standardization operation which incorporates other data to further standardize grades across institutions and courses, based upon other known academic metrics across institutions. For example, scores from standardized tests (e.g., MCAT, USMLE, COMLEX-USA, LSAT, GRE, GMAT, SAT, ACT, etc.) may be used as a benchmark which, in combination with the appropriate course grade distribution, can determine the rigor or difficulty of a given course at a given institution. The value of an applicant's grade in that course at that institution can then be adjusted appropriately. Once the average, median, mode, or distribution of test scores at each institution is known by the applicant data assessment platform, they can be used as a proxy for the capability of the students at that institution. Knowing both the capability of the students that took a given course and the distribution of grades given out by that course, the applicant data assessment platform can then determine the rigor or difficulty of a given course at a given institution, and can correspondingly increase the value of grades coming out of more difficult courses, or correspondingly decrease the value of grades coming out of less difficult courses.

For example, if the neurology clerkships at two different medical schools have identical grade distributions for their respective students, but the students at medical school A score, on average, a standard deviation higher on boards exams than do the students at medical school B, then it can be assumed that the neurology clerkship at medical school A is more rigorous or difficult than the same clerkship at medical school B, and the value of a grade from medical school A can be weighed higher than the value of the same grade from the same clerkship at medical school B. A number of transformations (e.g., including weighted average, linear, exponential, logarithmic, continuous, discontinuous, discrete, piecewise, or other functions, or any combination of these functions) can be used to reflect this difference by adjusting the value of the grades of one or both medical students. The most appropriate transformation can depend upon the context and data available. This approach of standardization across institutions does not need to use standardized test scores as the instrument of standardization, as demonstrated in this example. Additionally or alternatively, possible instruments of standardization can include school graduation rates, job placement rates, graduate school acceptance rates, post-educational salary data, or any other data deemed an appropriate standardization instrument in the appropriate context.

As such, correction factors may be applied by the applicant data assessment platform to scale the output of the grade standardizer/deflator to the appropriate scale for use in the rest of the applicant data assessment platform. In other words, performing the ML-based assessment can include performing at least one of a grade standardization or a grade inflation correction operation. It is to be understood that any combination of the techniques described herein can be used by the applicant data assessment platform, as well as the inclusion of other techniques.

Moreover, in any of the scenarios discussed herein, failing grades and the proportion of students that receive failing grades may or may not be included in the various transformations, depending on the context and what is deemed most appropriate by the applicant data assessment platform. Both continuous grading schema (e.g., numeric grades on a scale from 0-100) and categorical grading schema (e.g., A/B/C/D/F) can lend themselves to these approaches.

In some instances, the applicant data assessment platform can present an option to generate a grades prediction of students who attended medical schools with a pass/fail curriculum. The applicant data assessment platform can include a machine learning algorithm which uses the students that attend medical schools that report traditional grades to learn how to predict the grades that students at pass/fail medical schools would have gotten, had their medical schools assigned grades. Further, the applicant data assessment platform can include an option to predict class rank of students. This prediction is formed using machine learning. As such, the prediction algorithms of the applicant data assessment platform can fill in missing data entries for the applicant data.

In some embodiments, awards, certificates, and/or accomplishments may be provided as input data to the applicant data assessment platform. The applicant data assessment platform can present an option at the GUI to pull out and list any awards or accomplishments identified from the applicant data, and/or an option of whether or not to include the awards or accomplishments in the final score. In some instances, the awards or accomplishments are pulled automatically or without requiring a user input.

In some embodiments, international medical graduates may be rated differently using the application of a deflating or inflating multiplier to the score of graduates of medical schools outside the United States and/or Canada. Alternatively, an option can be presented at the GUI to choose to flag these candidates.

In some embodiments, the particular medical school (or other institution) may be provided as input data to the applicant data assessment platform. The applicant data assessment platform can present an option (e.g., at the GUI of the program host device) to take the medical school that an applicant attended into consideration, for instance, with an increased or decreased weight. Users can provide an input defining a preference parameter indicating whether they want the applicant data assessment platform to use the U.S. News rankings, NIH funding, or another metric as the marker for medical school quality. The GUI can also present an option to assess graduates of MD and DO schools differently, and/or an option to select institutions that produce students of particular interest.

In some embodiments, regional connections associated with an applicant may be provided as input data to the applicant data assessment platform. The applicant data assessment platform can present an option (e.g., at the GUI of the program host device) to take applicant regional connections into consideration. Applicants from the same state or region, or who attended college or medical school in the same state or region, can be assigned a multiplier to increase (or decrease) their final score. The applicant data assessment platform can identify "away rotations" as a regional connection for this multiplier.

In some embodiments, geographic preferences may be provided to the applicant data assessment platform as a preference parameter input. The applicant data assessment platform can present an option (e.g., at the GUI of the program host device) to consider any number of geographic preferences (e.g., one, two, three, four, etc.) indicated by applicants in their final score calculation.

In some embodiments, program preference signals associated with the applicant data may be provided as input data to the applicant data assessment platform. The applicant data assessment platform can present an option (e.g., at the GUI of the program host device) to consider whether an applicant sent a preference signal (e.g., an indication of high interest in the user's specific residency program) in the final score calculation for the applicant. Furthermore, the applicant data assessment can present the type of identified preference signal, which can be categorized/labelled based on strength or another metric (e.g., a "gold" signal, "silver" signal, etc.).

In some embodiments, the applicant data provided as input to the applicant data assessment platform can include an indication of honor society recognition (e.g., Alpha Omega Alpha (AOA)) or similar group involvement. AOA is a selective medical education honors society that inducts the highest performing medical students each year. The applicant data assessment platform can present an option (e.g., at the GUI of the program host device) to evaluate AOA membership as a part of the final applicant score. Users can also be presented with the option to cause the applicant data assessment platform to predict who would have been offered AOA membership at medical schools that do not have AOA chapters, using machine learning algorithms. Similarly, Gold Humanism Honor Society (GHHS) involvement, Sigma Sigma Phi (SSP) involvement, or other honor society involvements may be utilized as a component of the process. GHHS is a selective medical education honors society that inducts the "most empathetic" medical students each year. Users can be presented with the option to have the applicant data assessment platform evaluate GHHS membership as a part of the final applicant score. Users can also be presented with the option to cause the applicant data assessment platform to predict who would have been offered GHHS membership at medical schools that do not have GHHS chapters, using machine learning algorithms.

In some embodiments, the applicant data assessment platform can generate one or more "red flags" responsive to the applicant data inputs. For instance, the applicant data assessment platform can present an option (e.g., at the GUI of the program host device) to immediately apply one or more red flags to an application that demonstrates a previous criminal conviction, shows previous suspension or revocation of a medical license, demonstrates professionalism or other behavioral or performance concerns in medical school or previous training, has too few letters of recommendation (e.g., below a predetermined threshold number), was required to repeat any portion of the curriculum, failed any exams or courses in medical school or other education, previously failed to obtain a residency position, or shows that any medical boards exam was ever failed. The applicant data assessment platform can present an option (e.g., at the GUI of the program host device) to permit a user to define additional or custom red flag criteria for the applicant data assessment platform to monitor. For example, user-defined or custom red flag criteria may include one or more threshold values for any of the features or attribute indicators discussed herein, which can be defined by the user via preference parameter inputs. These can include a threshold GPA value, a threshold research output value, a threshold writing skill quality, a list of acceptable medical programs and/or unacceptable medical programs, an association with a particular instructor, and so forth. Furthermore, multiple threshold values can be provided for a single metric, which can define multiple tiers of thresholds and/or a scale of values for gradated scoring for that metric. Additionally, threshold values can be dynamically correlated in that meeting an upper threshold value for one metric can cause another threshold value of another metric to be lowered. By way of example, a GPA score threshold dynamically correlated to an MCAT score threshold could cause the MCAT score threshold to be lowered if the GPA score threshold is reached.

The applicant data assessment platform can present a custom criteria GUI for receiving these preference parameters defining red flag criteria. For instance, the custom criteria GUI can present one more fields and/or other interactive element for receiving the threshold GPA value and/or other threshold values from the user as user inputs. In this way, the applicant data assessment platform can have customized threshold values for that particular user, and can be used to create different threshold values for different users. In other words, one program may set a first threshold GPA value via the custom criteria GUI for their assessments, and another program can set a second threshold GPA value via the custom criteria GUI. The second threshold GPA value can be a different (e.g., higher or lower) value than the first threshold GPA value, which can reflect differences in how the different schools value GPA scores from their applicants. In scenarios where the program hosts are different companies, the different threshold values they provide can reflect different values between the companies and/or their industry sectors.

In some examples, any of the options or user preferences discussed herein can be provided to the applicant data assessment platform as preference parameters via interactive elements presented at a display of the program device, using the GUI. Additionally or alternatively, the applicant data assessment platform can perform a complete analysis on every set of applicant data associated with each applicant, regardless of what preference parameters are established by the user inputs. For example, the software can evaluate an applicant for regional connections, even if the user provided a preference parameter of uninterest for regional connections. The complete first analysis (e.g., a non-preference parameter driven analysis) by the applicant data assessment platform can then be pushed into a second "scoring" stage, where the scoring preferences of the user can then come into play to determine a final applicant score. Applicants can then be ranked from first to last based on this score.

In some examples, the applicant data assessment platform can generate an applicant ranking output which can be displayed on a webpage. The applicant ranking output can include a short bio on each applicant associated with the applicant data used for the applicant ranking output, including a name, a picture, medical school, etc. The bio can also contain a few of the outputs noted above, like themes or attribute indicators the applicant data assessment platform identified from the personal statement, or red flags. The applicant data assessment platform can present an option (e.g., at the GUI of the program host device) to modify which content is shown in the bio.

In some instances, once the ranking of applicants is generated, the applicant data assessment platform can present an option (e.g., at the GUI of the program host device) to modify the preference parameters through a Report Generation page, causing an immediate reshuffling of applicants according to the newly defined preference parameters, and presenting the immediate reshuffling at the display of the program host device. The list of applicants can also be filtered and sorted at the Report Generation page based on many different applicant features (e.g., race, gender, medical school, graduation year, and so forth). This feature of the applicant data assessment platform can result from evaluating every aspect of the plurality of application data sets initially, independent of preference parameters, so all the information the system needs to respond to any change in preference parameters is previously collected and/or accessible.

FIG. 1 illustrates an example of a computer system 100 that may be utilized to execute various procedures, including the operations of an applicant data assessment platform 102 described herein. The computer system 100 can comprise a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). The computing device 100 can be a host program device-a device associated with and/or operated by the school or entity hosting the program to which the applicant is applying (e.g., the host program device 504 discussed below regarding FIG. 5). Additionally or alternatively, the computer system 100 can be an applicant device, which is a device used by the applicant, for instance, to input/upload the applicant data files to the host program device.

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) that are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions can include special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments of the applicant data assessment platform 102 described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory and can be non-transitory.

Generally, a computing device can also be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any combination of the foregoing or other non-transitory devices. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two to transform the computing device into a special-purpose machine with many practical applications. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The administrator computing device 185 can be used by an administrative user to moderate content and to perform other administrative functions. The third-party computing device 195 may be used by third parties to receive communications from the user computing device, transmit communications to the user via the network, and otherwise interact with the various functionalities of the system.

Figure 2:
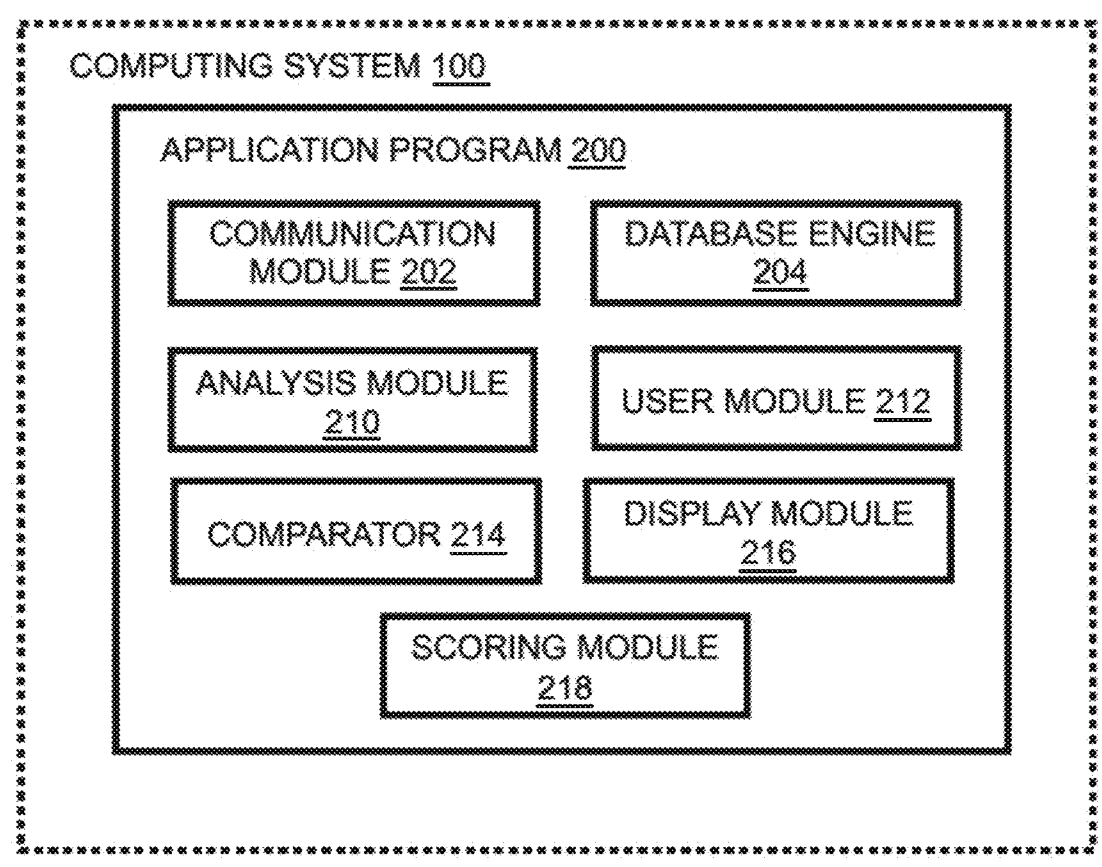
FIG. 2 illustrates an example application program and modules in communication with the computing system, which can form at least a portion of an applicant data assessment platform according to some embodiments.

FIG. 2 illustrates an example computer architecture for the application program 200 operated via the computer system 100 to implement the applicant data assessment platform 102. The computer architecture depicted in FIG. 2 can be similar to, identical to, and/or can form at least a portion of the computer system 100 depicted in FIG. 1. The computer system 100 can comprise several modules and engines configured to execute the functionalities of the application program 200, and a database engine 204 configured to facilitate how data is stored and managed in one or more databases. In particular, FIG. 2 is a block diagram showing the modules and engines which can perform specific tasks within the application program 200 to provide the applicant data assessment platform 102.

Referring to FIG. 2, the computing system 100 operating the application program 200 comprises one or more modules having the necessary routines and data structures for performing specific tasks, and one or more engines configured to determine how the applicant data assessment platform 102 manages and manipulates data. In some embodiments, the application program 200 comprises one or more of a communication module 202, a database engine 204, an analysis module 210, a user module 212, a comparator 214, a display module 216, and/or a scoring module 218.

In some embodiments, the communication module 202 is configured for receiving, processing, and transmitting a user command and/or one or more data streams. In such embodiments, the communication module 202 performs communication functions between various devices, including the user computing device 145 (e.g., the host program device 104), the administrator computing device 185, and a third-party computing device 195. In some embodiments, the communication module 202 is configured to allow one or more users of the system, including a third-party, to communicate with one another. In some embodiments, the communication module 202 is configured to maintain one or more communication sessions with one or more servers, the administrator computing device 185, and/or one or more third-party computing device(s) 195.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations.

Figure 3:
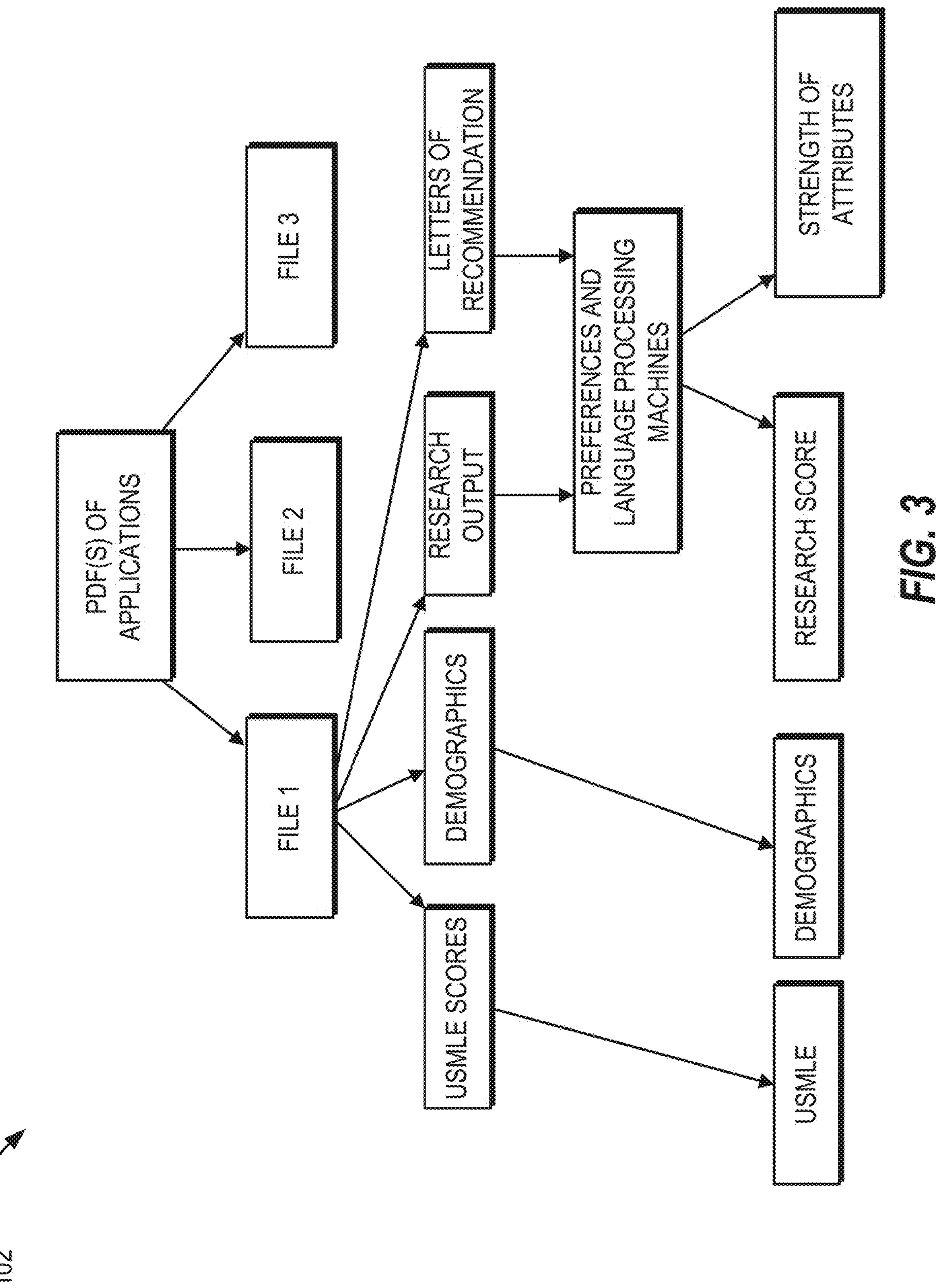
FIG. 3 illustrates a block diagram of an example feature analysis process of an applicant data assessment platform according to some embodiments.
Figure 5:
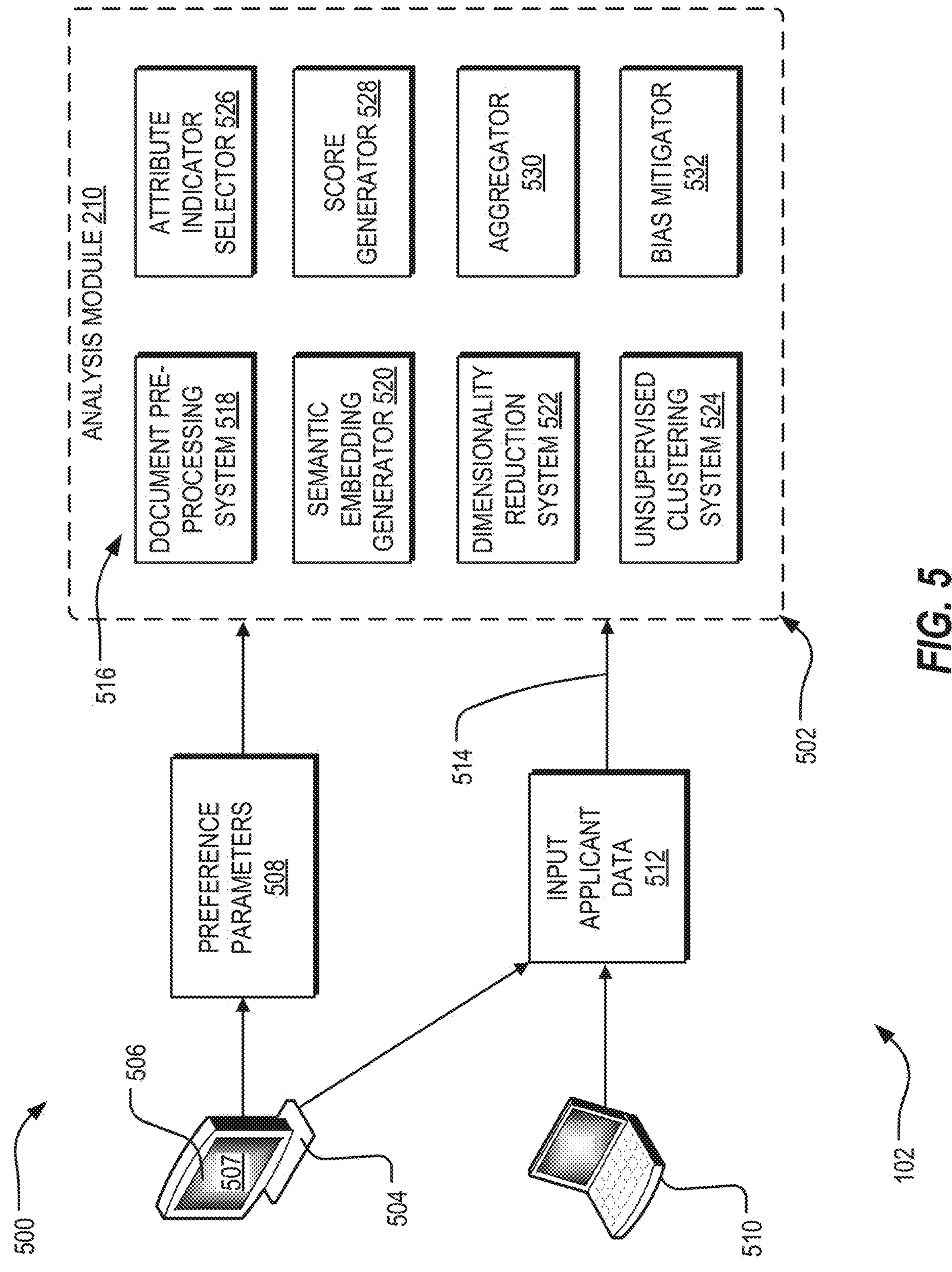
FIG. 5 illustrates a block diagram of an example machine-learning framework of an applicant data assessment platform according to some embodiments.

In some embodiments, the analysis module 210 forms part of and/or is in operable communication with the application program of the applicant data assessment platform 102 to receive the applicant data inputs (e.g., data files) and preference parameter inputs, and to evaluate the plurality of features extracted from the applicant data inputs to attribute a ranking to the user. The analysis module 210 may perform a process similar to that shown in FIG. 3, wherein user features are received and analyzed. FIG. 5 below further depicts a machine-learning framework of the analysis module 210 in additional detail.

In some embodiments, the user module 212 facilitates the creation of a user account for the applicant data assessment platform 102. The user module 212 may cause the applicant data assessment platform 102 to present an option (e.g., at the GUI of the program host device) for the user to create a user profile which includes user information, and user-associated information as well as user associated preferences (e.g., the preference parameters) which may be used to evaluate an applicant. Additionally, the user preferences can be shared with other users with the same program (e.g., residency program, medical school, business, and so forth).

In some embodiments, the comparator 214 is in operable communication with and/or forms a part of the applicant data assessment platform 102 (e.g., including the analysis module 210) to receive the ranking of the user and compare the ranking to one or more other users. The comparator may receive the plurality of features attributed to the other users and compare the features to one or more other users.

In some embodiments, the display module 216 is configured to display one or more graphic user interfaces, including, e.g., one or more user interfaces, one or more consumer interfaces, one or more video presenter interfaces, the GUI at the display of the host program device, etc. In some embodiments, the display module 216 is configured to temporarily generate and display various pieces of information and interactive user interface elements (e.g., data entry fields, drop-down menus, icons, and so forth) in response to one or more commands or operations, for instance, to present options for receiving the data file inputs and/or preference parameter inputs discussed herein. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed in a display module 216 may be stored in a database or may not be persistently stored.

Figure 4:
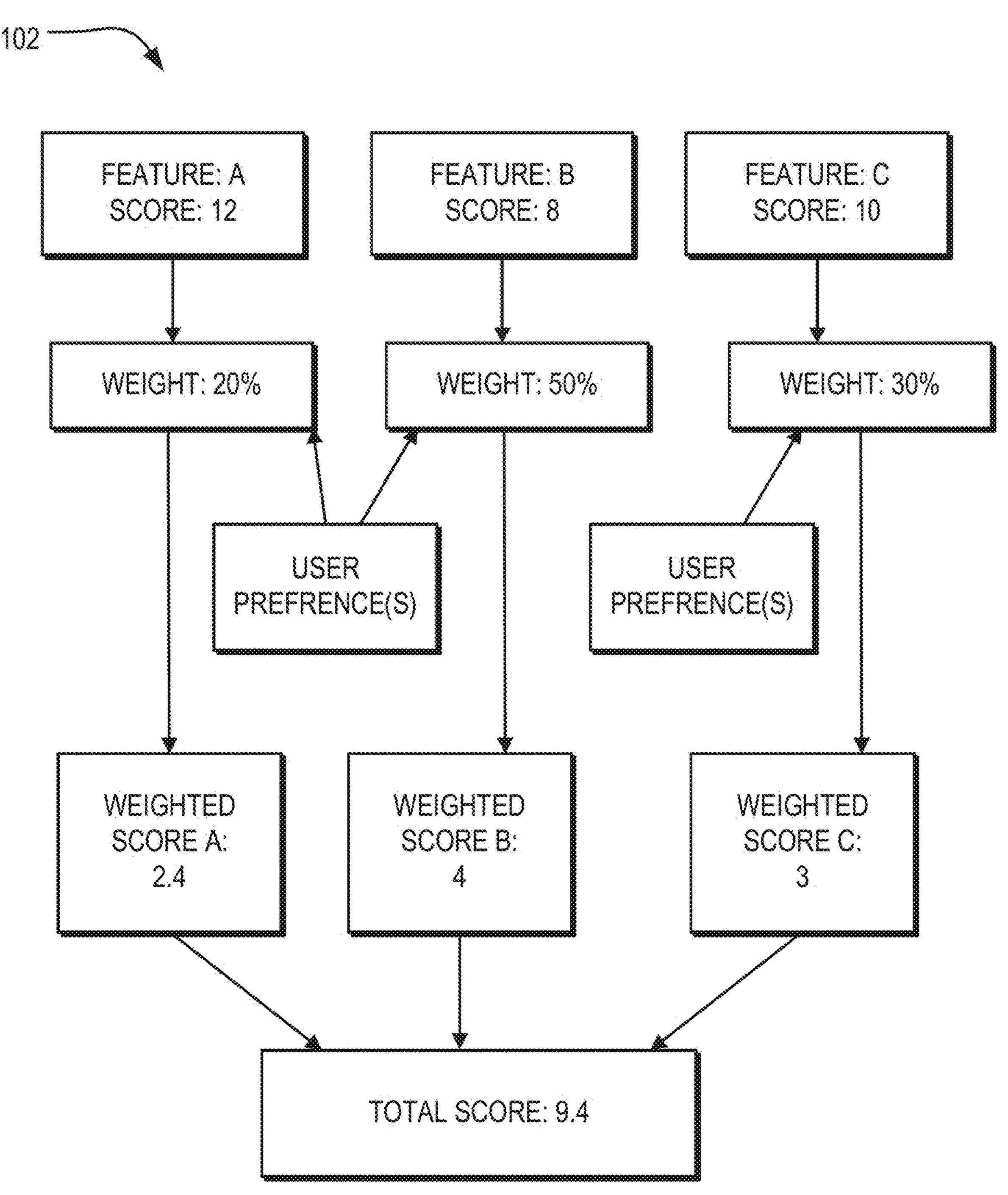
FIG. 4 illustrates a block diagram of an example user scoring process an applicant data assessment platform according to some embodiments.

In some embodiments, the scoring module 218 is operable to receive one or more user features and to output a score for the particular application as is shown in FIG. 4. The scoring module 218 may utilize weights for the different user feature in an embodiment wherein some features are more important to the user than other features.

FIG. 5 illustrates an example system 500 including a machine-learning framework 502 of the applicant data assessment platform 102. The system 500 depicted in FIG. 5 can be similar to, identical to, and/or can form at least a portion of the computer system(s) 100 depicted in FIGS. 1-4.

In some examples, the system 500 can include the program host device 504, which can be any of the computing devices discussed herein such as a device associated with and/or operated by the school or entity hosting the program to which the applicant is applying. The program host device 504 can have a display 506 presenting one or more GUI(s) 507 and GUI features discussed herein. As such, the 504 can receive inputs from the user to provide the various preference parameters 508 discussed herein to the applicant data assessment platform 102. The system 500 can also include the applicant device 510, or other third-party device, which can be used to provide the input applicant data 512 (e.g., document files 514) to the applicant data assessment platform 102. Additionally or alternatively, the input applicant data 512 can be provided to the applicant data assessment platform 102 by the program host device 504. For instance, the input applicant data 512 can be manually entered at the program host device 504, or the program host device 504 can receive any of the document files 514 discussed herein in response to one or more API calls to other servers/databases storing the data.

In some instances, the machine-learning (ML) framework 502 includes one or more ML components 516 for performing the machine-learning based operations discussed herein. The one or more ML components 516 of the applicant data assessment platform 102 can form at least part of the analysis module 210 and can include one or more of a document pre-processing system 518, a semantic embedding generator 520, a dimensionality reduction system 522, an unsupervised clustering system 524, an attribute indicator selector 526, a score generator 528, an aggregator 530, and/or a bias mitigator 532. The applicant data assessment platform 102 can implement one or more of these ML components 516 to analyze the text documents, such as those relating to the performance, qualifications, and suitability of applicants for employment or education (e.g., the input applicant data 512). For instance, as discussed herein, the machine-learning framework 502 can leverage natural language processing (NLP) and ML techniques to interpret, categorize, and/or score sentiments expressed about applicants in the input applicant data 512, and other performance-related metrics to form a structured, quantifiable, and consistent output.

In some examples, the machine-learning framework 502 includes the document pre-processing system 518. The document pre-processing system 518 can perform preprocessing operations to process the initially uploaded document files 514, which can include a splitting operation and/or a normalization operation. The splitting operation can include splitting the text into individual sentences. It is to be understood that 'sentences' as used is not necessarily literal sentences but can include any smaller chunks of the document text (e.g., phrases, clauses, a predefined number of words, etc.), which can be 8-80 words in length. After the splitting operation, the document pre-processing system 518 can perform the normalization operation by transforming sentences. The normalization operation can standardize the text features and common spelling variants, thereby reducing noise in the dataset and ensuring that the inputs to the ML components 516 are as uniform as possible. Additionally, the document pre-processing system 518 can incorporate a blinding process by identifying and then obscuring or removing potentially biasing identifiers from the text to ensure that the subsequent analysis is focused purely on the applicants' performance description rather than extraneous personal characteristics.

In some examples, the machine-learning framework 502 can include the semantic embedding generator 520. The semantic embedding generator 520 can transform sentences (e.g., the normalized sentences from the document pre-processing system 518) into a semantic vector space. This step can involve assigning each or most words or sentences a high-dimensional vector that quantifies its meaning based on the context it appears in. The semantic embedding generator 520 can use Word2Vec, GloVe, Bidirectional Encoder Representations from Transformers (BERT), and/or Sentence-BERT (SBERT), or other embedding tools to perform this operation. The resulting vectors can represent the sentences mathematically in a way that captures the underlying meaning of their language.

In some examples, the machine-learning framework 502 can include the dimensionality reduction system 522. For instance, the outputted embeddings from the semantic embedding generator 520 can have a high-dimensional nature. As such, the dimensionality reduction system 522 can apply a dimensionality reduction algorithm, like t-distributed Stochastic Neighbor Embedding (t-SNE), Principal Component Analysis (PCA), or Uniform Manifold Approximation and Projection (UMAP) to project the embeddings onto a lower-dimensional space while preserving the semantic representations, or as much as is possible (e.g., some information may be lost). In some scenarios, this step can improve the unsupervised clustering processes performed by the unsupervised clustering system 524 and/or can increase computational efficiency.

In some examples, the machine-learning framework 502 can include the unsupervised clustering system 524. The unsupervised clustering system 524 can cluster the reduced embeddings outputted by the dimensionality reduction system 522, for instance, using unsupervised learning algorithms such as K-means, Density-Based Spatial Clustering of Applications with Noise (DBSCAN), or hierarchical clustering. In some examples, the unsupervised clustering system 524 uses Hierarchical-DBSCAN (e.g., an extension of DBSCAN which converts DBSCAN to a hierarchical clustering algorithm), or other clustering systems, to extract a flat clustering based on the stability of clusters. These algorithms of the unsupervised clustering system 524 can group inputs based on their similarity without the need for pre-labelled data. The unsupervised clustering system 524 can determine the number of clusters heuristically and/or by using methods like the elbow method or silhouette scores.

In some examples, the machine-learning framework 502 can include the attribute indicator selector 526. For instance, after the clustering phase, the attribute indicator selector 526 can interpret and/or identify the most pertinent attribute indicators. These attribute indicators can be the semantic anchors corresponding to key sentiments or characteristics present in the analyzed texts. The careful selection of these indicators can improve accuracy for the score generator 528.

The steps performed by the attribute indicator selector 526 can include an identifying a selector step. For instance, the applicant data assessment platform 102 can provide for both developer and user input in selecting attribute indicators. For example, developers may initially analyze clusters to identify key themes (e.g., by providing a plurality of input applicant data sets to the attribute indicator selector 526), while end-users with domain knowledge can customize indicators to suit specific role requirements (e.g., by providing the preference parameters 508 to the attribute indicator selector 526). The steps performed by the attribute indicator selector 526 can also include a qualitative analysis step. For instance, various personnel (e.g., experts) can undertake a thorough review of the candidate attribute indicators to determine which ones encapsulate the targeted qualities or attributes, such as leadership acumen, collaborative spirit, inventive traits, etc. Consideration for domain-specific context at this step can align the attribute indicators with their intended underlying attributes.

Furthermore, the steps performed by the attribute indicator selector 526 can include a customization and configuration step in which the attribute indicator selector 526 facilitates the customization of attribute indicators through user input (e.g., at the various GUI 507 of program host device 504). These configuration mechanisms can provide a prioritization layer for the attribute indicators within the scoring algorithm, reflecting their significance in the overall assessment. The steps performed by the attribute indicator selector 526 can also include a multiple-cluster aggregation step. For instance, the attribute indicator selector 526 can integrate multiple clusters representing similar sentiments or qualities into a singular, composite attribute indicator. During this process, the attribute indicator selector 526 can assign different weights to similar sentiments based on their rarity relative to other identified sentiments. This can enhance the capturing of nuanced or rare sentiments that might otherwise be overlooked. Additionally or alternatively, the attribute indicator selector 526 can perform an iterative enhancement step. For example, the attribute indicator selector 526 can process additional data (e.g., additional input applicant data 512 and/or additional preference parameters 508) in a continuous or ongoing manner. Upon processing additional data, the attribute indicator selector 526 can suggest new potential indicators based on automatically recognized novel patterns. Domain experts can refine the selection of indicators to reflect new insights or patterns identified through this continuous learning.

In some examples, the machine-learning framework 502 includes the score generator 528. For instance, to score the document files 514, the score generator 528 can compute a score by comparing the embedding representation of sentences in the new document and the representation of the selected attribute indicators. For this, metrics such as Euclidean distance, cosine, or density-based membership estimation can be used. This can include a soft-cluster inference implemented as a part of the HDBSCAN algorithm. The score generator 528 can score each sentence for the derived attribute indicators, with the score reflecting semantic closeness to the sentiment each attribute indicator represents. This score range can provide a quantification of sentiment strength. Each sentence can meaningfully contribute to zero, one, or multiple attribute indicators when scored by the score generator 528.

In some instances, the machine-learning framework 502 can include the aggregator 530. The aggregator 530 can aggregate individual sentence scores into one or more aggregated scores. For instance, the aggregation could be a simple average, weighted sum, or another method depending on the domain and importance assigned to different clusters. By way of example, for each indicator, a simple sum of sentence scores can be raised to the power of two, excluding sentence scores that fall below a preset threshold (e.g., as they may be unlikely to be meaningfully related to the indicator of interest). This can give additional weight to scores that the model is highly confident are related to an indicator while dampening the impact of noise. The aggregated scores generated by the aggregator 530 can represent quantifiable measures of the sentiments expressed. The system can aggregate scores at different levels to provide different insights into an applicant, a cohort of applicants, or an author of a document.

For instance, at a document aggregation level, sentence scores can be aggregated to generate an overall score for each document of a set of documents forming the set of input applicant data 512 for a particular applicant. This score can be indicative of the sentiment and competencies reflected in that particular text. At the applicant aggregation level, multiple documents may be evaluated for a single individual, and scores from all pertinent documents can be aggregated to form a unified profile of the applicant's attributes (e.g., including a final score and/or the bio). At the document author/source aggregation level, the aggregator 530 can aggregate scores across different documents produced by the same individual or source. This may be useful for identifying consistent patterns or biases in assessments provided by specific evaluators or institutions. At the cohort/pool aggregation level, the aggregator 530 can aggregate scores across all applicants within a defined group, which could be defined based on one or more factors such as an application period, a department, or demographic categories like race, gender, or age. This can aid in uncovering trends over time and can provide insights for user or organizational efforts towards diversity, equity, and inclusion.

In some scenarios, the machine-learning framework 502 can include the bias mitigator 532. The bias mitigator 532 can be implemented to bolster the fairness and objectivity of the sentiment analysis. For instance, the bias mitigator 532 can implement bias exploration and mitigation strategies within the workflow during the document pre-processing operations of the document pre-processing system 518. This can include anonymization operations such as applying pattern recognition and heuristic rules to identify and redact gender identifiers, names, and other identifying characteristics which could induce bias (e.g., learned during model pre-training) during the analysis. The bias mitigator 532 can also perform semantic substitution operations (e.g., during the document pre-processing step) by replacing potentially biasing terms with neutral alternatives to preserve the semantic structure of the statements (e.g., rather than outright removal of the potentially biasing term). Additionally or alternatively, the bias mitigator 532 can perform bias mitigation operations after the aggregation step. These can include a quantitative analysis after the primary sentiment analysis, in which the bias mitigator 532 performs a statistical review of the distribution of indicator scores across features. In other words, the bias mitigation operations can be performed as part of the document normalization. Also, at the final score generation, a bias mitigation operation can be performed again if the user directs the software to do so, for instance, to adjust scores of personal qualities based on statistical evidence of bias. The bias mitigator 532 can also implement an adjustment mechanisms based on the review findings and user input, in which the bias mitigator 532 may apply adjustments or corrections to the scores to counteract any observed differences or biases. This could involve recalibrating the scoring model or applying an algorithmic correction factor to ensure a more equitable assessment. In some scenarios, the applicant data assessment platform 102 may equip users with tools to oversee and adjust the bias mitigation process directly, for instance, by presenting the tools of the bias mitigator 532 at the various GUIs 507 of the program host device 504. Users may fine-tune the process to align with their preferences, specific fairness standards, or regulatory compliance requirements of their domain.

In some examples, using the techniques disclosed herein, the applicant data assessment platform 102 can perform enhanced embeddings with domain-specific insights from unsupervised learning. Embeddings are numeric vector representations of text that aim to represent semantic meaning in mathematical form. Customized embeddings can be created from general language embedding models fine-tuned on labelled domain-specific data ('supervised learning'), which the model can use to learn the semantic nuances of that context. As disclosed herein the unsupervised machine learning techniques can be integrated with domain-driven insights. By extracting clusters of semantically similar sentences, the applicant data assessment platform 102 can independently uncover recurring linguistic patterns that may not be captured in more general-purpose embeddings. The applicant data assessment platform 102 can also use the attribute indicators selected for their relevance to specific competencies or roles to gain an advanced capability to interpret subtle contextual distinctions. This can provide for the creation of embeddings that are closely attuned to the context of the field while omitting the need for a preexisting large, manually labeled dataset.

In some examples, the machine-learning framework 502 can implement any of the one or more ML components 516 with a continuous learning protocol. To maintain relevance and adapt to new types of text, the system 500 can update its models and cluster representations based on new documents processed, ensuring that the system's understanding of language remains current and provides for the quantification of language use to shift over time. Furthermore, the system 500 can provide one or more user interface(s), such as the GUI 507 at the program host device 504 and/or at the applicant device 510, to input new documents, display the scores derived, and/or present indications of insights into how the scores are calculated, for instance, with visual aids like graphs or heat maps. The outputs generated and/or presented by the applicant data assessment platform 102 can also include interpretative guidelines that contextualize the scores.

Additionally in some examples, the applicant data assessment platform 102 can be configured for robust error handling, as discussed herein, to deal with malformed input and other potential data issues, which further increases the efficiency and accuracy of the model's outputs. The applicant data assessment platform 102 can also be designed to efficiently process a large number of documents through the use of distributed computing frameworks. Moreover, the architecture of the applicant data assessment platform 102 is technically extensible in that it can easily integrate additions of new NLP and ML models as they become available, which can further improve accuracy and understanding.

In some scenarios, multiple benefits can result from the applicant data assessment platform 102 disclosed herein. For example, the applicant data assessment platform 102 provides for an unstructured approach. The applicant data assessment platform 102 uses unsupervised learning to analyze the pool of documents and identify patterns and attributes that the user may be interested in. This approach may omit requiring prior knowledge about the content of the documents. By employing advanced NLP techniques such as word embeddings, the applicant data assessment platform 102 can convert sentences into a mathematical representation of meaning. As such, the applicant data assessment platform 102 can understand the semantic content of the sentences, providing a more accurate analysis of the sentiments expressed about the applicants. Furthermore, by using the score generator 528, the applicant data assessment platform 102 can generate gradations in meaning by applying a score to each sentence of each document, such that the applicant data assessment platform 102 can handle complex and nuanced sentiments, making it more effective in assessing the suitability of applicants for a role. The applicant data assessment platform 102 can learn from the documents it processes meaning it can adapt to different domains and types of applications. This makes it versatile and broadly applicable, capable of handling a wide range of recruitment, admissions, or performance review scenarios.

Furthermore, unlike other types of systems which may rely on predefined categories or labels, the applicant data assessment platform 102 can independently identify and categorize sentiments expressed about applicants. The applicant data assessment platform 102 can derive attributes from the content present in a pool of documents, which can eliminate the need for pre-labelled data. This provides a technical solution to technical problems arising in data management for machine-learning models. Additionally, unlike other systems, the applicant data assessment platform 102 is not easily fooled by simply throwing in keywords. The applicant data assessment platform 102 can use a semantic analysis to analyze the entire context of the document rather than simply keyword matching, which can ensure a more accurate and comprehensive evaluation. In other words, the applicant data assessment platform 102 can use advanced NLP techniques to capture the nuanced meanings of text to accurately interpret the complexity of human language.

Also, in some examples, some methods of evaluating applicants (e.g., reading the applications in full or part) are prone to human bias and subjectivity, which can lead to unfair assessments. The applicant data assessment platform 102 can mitigate this by using the bias mitigator 532 to provide an objective, data-driven approach to sentiment analysis, which can reduce the potential for biased evaluations. Furthermore, manually reviewing large volumes of text can be time-consuming and not scalable. Other systems that automate this process may struggle with accuracy and context understanding. The applicant data assessment platform 102 addresses this technical problem of machine-learning scalability by automating the analysis process while maintaining high levels of accuracy and context awareness. Moreover, even though language is inherently ambiguous and nuanced, which can pose a challenge for some automated systems, the application data assessment platform 102 can overcome these issues. For instance, the components of the applicant data assessment platform 102 disclosed herein are better equipped to handle sentences that have multiple interpretations, subtle sentiments, and other such complexities. The applicant data assessment platform 102 has higher resistance to manipulation by applicants (e.g., or other people such as writers of letters of recommendation or performance reviews) who "game" machine-learning system with keyword stuffing. The applicant data assessment platform 102 is resistant to such manipulation because it can evaluate the semantic content of the entire document rather than relying on the presence of specific keywords.

In some scenarios, the applicant data assessment platform 102 can be used for recruitment. For instance, the program host device(s) 504 executing the applicant data assessment platform 102 may be associated with companies which use this technology to analyze resumes, cover letters, and other application documents to assess the suitability of candidates for a job. The applicant data assessment platform 102 can help HR departments streamline their hiring process, making it more efficient and objective. Furthermore, the applicant data assessment platform 102 can be used for admissions. The program host device(s) 504 executing the applicant data assessment platform 102 may be associated with educational institutions which use this technology to evaluate letters of recommendation to determine the suitability of applicants for admission. Additionally, the applicant data assessment platform 102 can be used for performance review. For instance, the program host device(s) 504 executing the applicant data assessment platform 102 can be associated with companies which use this technology to analyze performance reviews and other feedback to assess the performance of their employees. This can assist in making decisions about promotions, raises, and other rewards.

Figure 6:
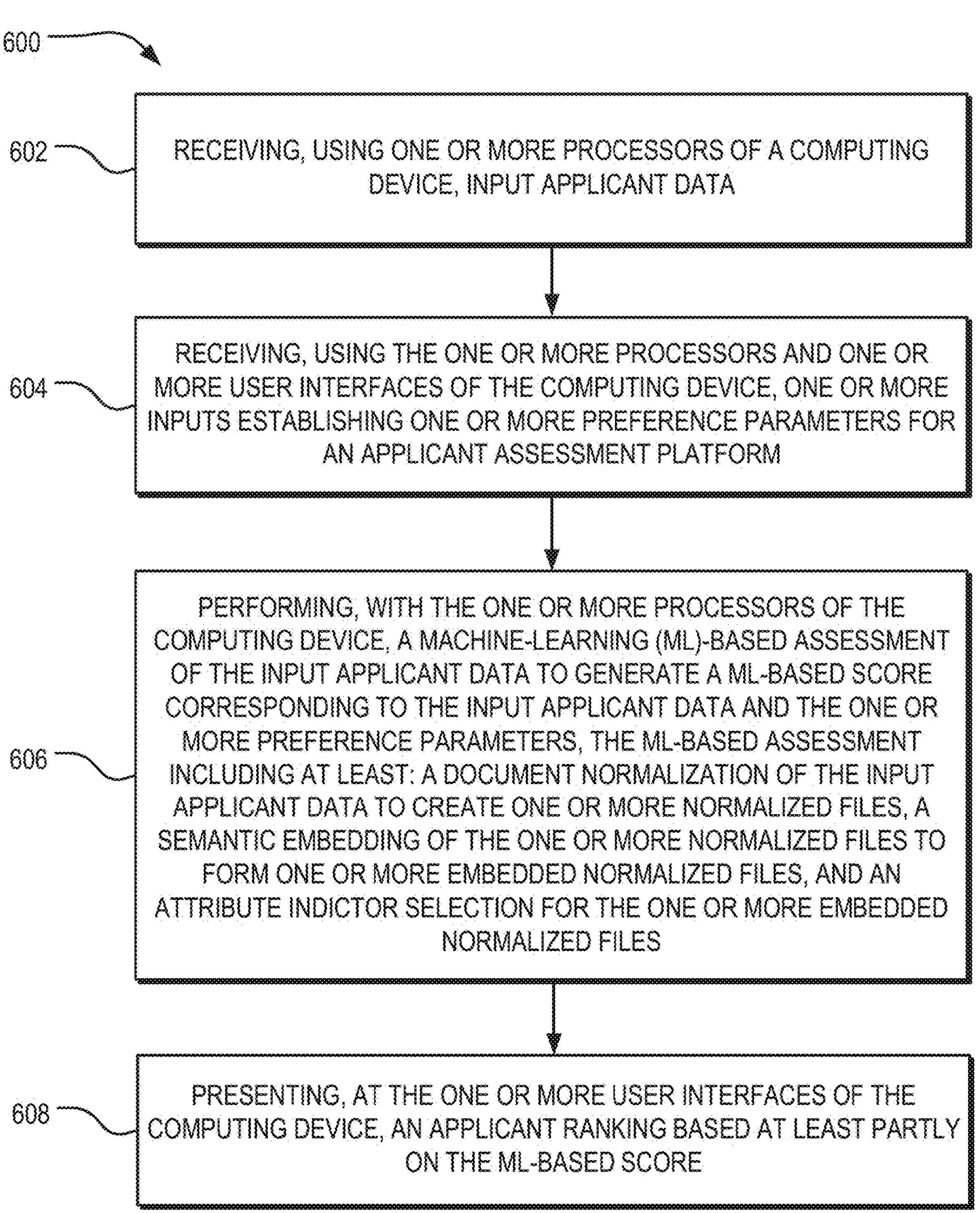
FIG. 6 illustrates a flow chart of an example method of assessing applicant data according to some embodiments.

FIG. 6 illustrates an example method 600 of assessing applicant data, which can be performed by any of the systems 100-500 disclosed herein.

In some instances, at operation 602, the method 600 can receive, using one or more processors of a computing device, input applicant data including one or more document files. At operation 604, the method 600 can receive, using the one or more processors of the computing device, one or more inputs establishing one or more preference parameters for an applicant assessment platform. At operation 606, the method 600 can perform, with the one or more processors of the computing device, a machine-learning (ML)-based assessment of the one or more document files to generate a ML-based score corresponding to the input applicant data and the one or more preference parameters, the ML-based assessment including at least: a document normalization of the one or more document files to create one or more normalized document files, a semantic embedding of the one or more normalized document files to form one or more embedded normalized files, and an attribute indictor selection for the one or more embedded normalized files. It is to be understood that the ML-based score can be based partly on ML operations, and can also be based on one or more non-ML based operations or calculations as well. In other words, the ML-based score can be an aggregation of different types of operations, some of which being ML operations. At operation 608, the method 600 can present, at one or more user interfaces communicatively coupled to the computing device, an applicant ranking based at least partly on the ML-based score.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions. For instance, implementation of the applicant data assessment platform as software onto a particular arrangement of hardware components can convert these components into a special purpose computer for performing the operations disclosed herein. The special purpose computer can integrate the software into many practical applications by addressing the technical issues arising from machine learning based modeling systems disclosed herein, and improving the accuracy and efficiency of the generated outputs. Moreover, the specific computational architecture of the applicant data assessment platform can convert input data (e.g., inputted document files) into new types of data, such as the embedded normalized files, the attribute indicators, etc., which further enables the modeling system to provide a technical solution to the machine learning modeling issues discussed herein.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse).

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A method to assess applicant data, the method comprising:

receiving, using one or more processors of a computing device, input applicant data;

receiving user input, at a user interface of a host computing device, indicating a preference parameter modifying how a weight of an attribute of the input applicant data is used to calculate an ML-based score, the weight of the attribute is based at least partly on a publication inflation reduction procedure;

performing, with the one or more processors of the computing device, a machine-learning (ML)-based assessment of the input applicant data to generate a ML-based score corresponding to the input applicant data and using the preference parameter, the ML-based assessment including:

a normalization of text data from the input applicant data to create one or more normalized files, and a grade extraction procedure performed using the one or more normalized files;

a weight adjustment based on the preference parameter; and presenting, at one or more user interfaces of the computing device, an applicant ranking based at least partly on the ML-based score.

2. The method of claim 1, wherein, the performing of the ML-based assessment includes determining a particular school associated with the input applicant data, and the grade extraction procedure includes a determination of a grade score with an adjustment corresponding to the particular school.

3. The method of claim 2, further comprising:

training an ML-based model, for performing the ML-based assessment, by receiving user-provided application categorization labels including at least one of an interview label, a waitlist label, or a reject label.

4. A system to assess applicant data, the system comprising:

input applicant data provided to one or more processors of one or more computing device;

a document pre-processing system, executed by the one or more processors, to normalize the input applicant data to form normalized data;

a grade standardization system, executed by the one or more processors, to extract one or more grade values from the normalized data; and a machine-learning (ML)-based score generated with a trained ML model using the one or more grade values, the ML-based score or the one or more grade values being presented at a display of the one or more computing device with a bio associated with the input applicant data;

a graphical user interface (GUI) of a host computing device presenting:

an option to receive a preference parameter to modify a weight used to generate the ML-based score; and a list of applicants sorted based on the ML-based score and the preference parameter provided to the GUI of the host computing device.

5. The system of claim 4, wherein, the ML-based score is further based on one or more numerical weights, provided as user input at the computing device, for one or more sections of an application represented by the input applicant data.

6. The system of claim 4, further comprising:

a list of a plurality of ranked or scored applicants, presented at the display, based on a plurality of ML-based scores generated by the trained ML model.

7. The system of claim 4, wherein, the one or more computing device includes the host computing device, the system includes the one or more preference parameters based on user inputs provided at the GUI of the host computing device, and the ML-based score is based at least partly on the one or more preference parameters.

8. The system of claim 4, wherein, normalizing the input applicant data includes performing a noise reduction based on determining common spelling variants.

9. The system of claim 4, further comprising:

a preference parameter, considered by the trained ML model, related to a research or publication output.

10. The system of claim 9, further comprising:

a preference parameter, considered by the trained ML model, related to an authorship position for the research or publication output of an applicant.

11. The system of claim 4, further comprising:

an indication of a preference signal based on the applicant input data.

12. A device to assess applicant data, the device comprising:

one or more processors; and one or more non-transitory memory devices storing instructions which, when executed by the one or more processors, cause the device to:

receive input applicant data;

present a plurality of options corresponding to a plurality of preference parameters at a graphical user interface (GUI) of a host computing device;

adjust one or more weights based on one or more user inputs at the host computing device indicating one or more preference parameters of the plurality of preference parameters;

perform a machine learning (ML)-based assessment of the input applicant data, including a grade standardization operation, to generate the ML-based score corresponding to the input applicant data;

present an initial list of applicants, at the GUI on a display, including an applicant ranking based on the ML-based score; and present a reshuffled list of applicants, at the GUI on the display, based on the applicant ranking and the one or more weights.

13. The device of claim 12, wherein, the performing of the ML-based assessment includes a document normalization of one or more document files of the input applicant data to create one or more normalized documents, and the ML-based assessment uses the one or more normalized documents to generate the ML-based score.

14. The device of claim 12, wherein, the instructions, when executed by the one or more processors, cause the device to receive, via the GUI of the display, the one or more preference parameters indicating whether, in generating the ML-based score, the ML-based assessment considers languages, memberships, or research outputs.

15. The device of claim 12, wherein, the grade standardization operation includes standardizing a grade value to generate the ML-based score across multiple different grade schema.

16. The device of claim 15, wherein, the multiple different grade schema includes at least one of a letter grade scheme, a numerical grade scheme, or a categorical grade scheme.

17. The device of claim 16, wherein, the categorical grade scheme includes an honors/high pass/pass/fail scheme.

18. The device of claim 12, wherein, the grade standardization operation includes generating the ML-based score based at least partly on a percentile rank.

19. The device of claim 12, wherein, the instructions, when executed by the one or more processors, cause the device to present an option, at the user interface, to sort, filter, or categorize the initial list of applicant rankings, or the reshuffled list of applicant rankings.

20. The method of claim 1, wherein, the publication inflation reduction procedure includes:

performing natural language processing on a first research output of the applicant input data;

performing natural language processing on a second research output of the applicant input data, the second research output has a different type of data format than the first research output;

determining the first research output and the second research output correspond to a same underlying research based on the natural language processing of the first research output and the second research output; and removing, for the weight adjustment, one of the first research output or the second research output.

21. The method of claim 1, further comprising:

determining a research output metric from the input applicant data; and adjusting, subsequent to training of a ML-based model used to perform the ML-based assessment, a contribution of the research output metric score relative to other attribute indicator scores to generate the ML-based score.

* * * * *